(12) United States Patent
Miwata

(10) Patent No.: US 12,516,681 B2
(45) Date of Patent: Jan. 6, 2026

(54) VACUUM PUMP, ROTATING BODY, COVER PORTION, AND MANUFACTURING METHOD OF ROTATING BODY

(71) Applicant: Edwards Japan Limited, Yachiyo (JP)

(72) Inventor: Tooru Miwata, Yachiyo (JP)

(73) Assignee: Edwards Japan Limited, Yachiyo (JP)

( * ) Notice: Subject to any disclaimer, the term of this patent is extended or adjusted under 35 U.S.C. 154(b) by 0 days.

(21) Appl. No.: 18/258,869

(22) PCT Filed: Jan. 11, 2022

(86) PCT No.: PCT/JP2022/000595
§ 371 (c)(1),
(2) Date: Jun. 22, 2023

(87) PCT Pub. No.: WO2022/158336
PCT Pub. Date: Jul. 28, 2022

(65) Prior Publication Data
US 2024/0295227 A1 Sep. 5, 2024

(30) Foreign Application Priority Data
Jan. 20, 2021 (JP) .................................. 2021-007344

(51) Int. Cl.
| | |
|---|---|
| *F04D 29/66* | (2006.01) |
| *F04D 19/04* | (2006.01) |
| *F04D 29/60* | (2006.01) |

(52) U.S. Cl.
CPC ......... *F04D 29/662* (2013.01); *F04D 19/042* (2013.01); *F04D 29/601* (2013.01)

(58) Field of Classification Search
CPC .... F04D 19/042; F04D 29/601; F04D 29/602; F04D 29/66; F04D 29/661; F04D 29/662; F04D 19/04; F04D 29/023; F05D 2260/95
See application file for complete search history.

(56) References Cited

U.S. PATENT DOCUMENTS

| | | | |
|---|---|---|---|
| 6,890,145 B2 * | 5/2005 | Takamine | F04D 19/04 415/217.1 |
| 9,926,792 B2 | 3/2018 | Tsutsui | |

(Continued)

FOREIGN PATENT DOCUMENTS

| | | |
|---|---|---|
| JP | 2003148389 A | 5/2003 |
| JP | 2007239464 A | 9/2007 |

(Continued)

OTHER PUBLICATIONS

International Search Report and Written Opinion of International Application No. PCT/JP2022/000595 dated Mar. 1, 2022, 10 Pages.

(Continued)

*Primary Examiner* — Michael J Tsai
*Assistant Examiner* — Charles W Nichols
(74) *Attorney, Agent, or Firm* — Shumaker & Sieffert, P.A.

(57) ABSTRACT

A vacuum pump which prevents dust generation from a shaft by avoiding contact between a top portion of the shaft and corrosive gas and includes a balance correction function for a rotating body. A vacuum pump includes a rotating body including a rotating shaft and a rotor blade which has a through hole, through which a top portion of the rotating shaft is caused to pass, and is fixed with the top portion, and a cover portion fixed to the rotating to cover the top portion and the through hole. The cover portion includes a balance correction function for the rotating body and corrosion resistance to exhaust gas. The cover portion, prevents contact between the top portion and corrosive gas and prevents dust generation from the shaft.

6 Claims, 11 Drawing Sheets

(56) References Cited

U.S. PATENT DOCUMENTS

| | | | |
|---|---|---|---|
| 2003/0095860 A1 | 5/2003 | Takamine et al. | |
| 2007/0031270 A1* | 2/2007 | Maejima | F04D 19/042 |
| | | | 417/423.4 |
| 2014/0271174 A1 | 9/2014 | Bottomfield | |
| 2018/0058478 A1* | 3/2018 | Kimura | F04D 29/662 |
| 2019/0032669 A1 | 1/2019 | Kawanishi et al. | |

FOREIGN PATENT DOCUMENTS

| | | |
|---|---|---|
| JP | 3144272 U | 8/2008 |
| JP | 5255752 B2 | 8/2013 |
| JP | 2018035684 A | 3/2018 |
| WO | 2017138154 A1 | 12/2018 |

OTHER PUBLICATIONS

Extended Search Report from counterpart European Application No. 22742458.7 dated Nov. 5, 2024, 7 pp.

* cited by examiner

VACUUM PUMP, ROTATING BODY, COVER PORTION, AND MANUFACTURING METHOD OF ROTATING BODY

This application is a U.S. national phase application under 35 U.S.C. § 371 of international application number PCT/JP2022/000595 filed on Jan. 11, 2022, which claims the benefit of JP application number 2021-007344 filed on Jan. 20, 2021. The entire contents of each of international application number PCT/JP2022/000595 and JP application number 2021-007344 are incorporated herein by reference.

TECHNICAL FIELD

The present disclosure relates to a vacuum pump, a rotating body, a cover portion, and a manufacturing method of the rotating body.

Specifically, the present disclosure relates to a vacuum pump which has corrosion resistance to exhaust gas while performing balance correction of a rotating body by covering a top portion of a shaft of the rotating body with a cover portion fixed to the rotating body, and relates to the rotating body, the cover portion, and moreover relates to a manufacturing method of the rotating body.

BACKGROUND

A vacuum pump includes a rotor blade fixed to a rotating shaft (shaft) and a stator blade, rotates the rotating shaft at high speed, and performs vacuum-exhaust of air in a process chamber, which requires high vacuum, by interaction of the rotor blade, which is rotating at high speed, and the stator blade. In exhausted gas, for example, chlorine-based or fluorine sulfide-based corrosive gas is present and, when the corrosive gas comes into contact with, e.g., the shaft, there is a possibility that dust generation may occur from a shaft surface.

For example, as a fastening structure of the rotor blade and the rotating shaft (shaft), there is a structure in which a top portion of the shaft (rotor shaft) protrudes from the rotor blade and a washer for achieving balance.

SUMMARY

For the vacuum pump of this disclosure, the top portion of the shaft is a portion which, first, comes into contact with the corrosive gas taken in from an inlet port and is most likely to be influenced by the corrosive gas, and certain measures should be taken. In particular, when the dust generation is caused by contact of the top portion of the shaft with the corrosive gas, there is a possibility that the corrosive gas may flow backward from the inlet port to the process chamber, and may adversely affect quality of a product (wafer).

In some examples, corrosion may be prevented by forming a corrosion prevention film on inner and outer peripheral surfaces of a rotor (rotor blade) using electroless plating or by applying a corrosion-resistant adhesive or paint to the inner and outer peripheral surfaces thereof. In some examples, a vacuum pump may achieve balance of a rotating body over a long period of time while protecting the rotating body of a turbo-molecular pump against corrosive gas by performing anti-corrosion treatment on the rotating body of the turbo-molecular pump.

On the other hand, when the anti-corrosion treatment is performed on the top portion of the rotating shaft, balance of the rotating body constituted of the shaft and the rotor blade fixed to the shaft may be influenced.

An object of the present disclosure is to provide a vacuum pump which prevents dust generation from a shaft by avoiding contact between a top portion of the shaft and corrosive gas, and which includes a balance correction function for a rotating body, and relates to the rotating body, a cover portion, and moreover relates to a manufacturing method of the rotating body.

The disclosure of the present application, in a first aspect, provides a vacuum pump including: a rotating body including a rotating shaft which is rotatably supported and a rotor blade which has a through hole, through which a top portion of the rotating shaft is caused to pass, and is fixed with the top portion caused to pass through the through hole; and a cover portion which is fixed to the rotating body so as to cover the top portion of the rotating shaft and the through hole, wherein the cover portion includes a balance correction function for correcting unbalance of the rotating body and has corrosion resistance to exhaust gas.

the disclosure of the present application, in a second aspect, provides the vacuum pump according to the first aspect of the disclosure, wherein the corrosion resistance of the cover portion to the exhaust gas is achieved by performing corrosion-resistant surface treatment on the cover portion.

the disclosure of the present application, in a third aspect, provides the vacuum pump according to the first or second aspect of the disclosure, wherein the cover portion includes a portion which is fitted to a tool for fixing or supporting the rotating body.

the disclosure of the present application, in a fourth aspect, provides the vacuum pump according to the first, second, or third aspect of the disclosure, wherein the balance correction function is performed by a balance correction weight disposed in a concave portion provided in the cover portion, and the balance correction weight has the corrosion resistance to the exhaust gas.

The disclosure of the present application, in a fifth aspect, provides the vacuum pump according to the fourth aspect of the disclosure, wherein the corrosion-resistant surface treatment to the exhaust gas is performed on the balance correction weight.

The disclosure of the present application, in one aspect, provides a rotating body including: a rotating shaft which is rotatably supported; and a rotor blade which has a through hole, through which a top portion of the rotating shaft is caused to pass, and is fixed with the top portion caused to pass through the through hole, the rotating body further including: a cover portion which is fixed to the rotating body so as to cover the top portion of the rotating shaft and the through hole, wherein the cover portion includes a balance correction function for correcting unbalance of the rotating body and has corrosion resistance to exhaust gas.

The disclosure of the present application, in another aspect, provides a cover portion which is fixed to a rotating body so as to cover a top portion of a rotating shaft and a through hole of the rotating body including the rotating shaft which is rotatably supported and a rotor blade which has the through hole, through which the top portion of the rotating shaft is caused to pass, and is fixed with the top portion caused to pass through the through hole, the cover portion including a balance correction function for correcting unbalance of the rotating body, the cover portion having corrosion resistance to exhaust gas.

The disclosure of the present application, in some aspects, provides a manufacturing method of a rotating body including a rotating shaft which is rotatably supported and a rotor blade which has a through hole, through which a top portion of the rotating shaft is caused to pass, and is fixed with the top portion caused to pass through the through hole, the manufacturing method including: fixing a cover portion having corrosion resistance to exhaust gas to the rotating body such that the cover portion covers the top portion of the rotating shaft and the through hole; and correcting unbalance of the rotating body in a state in which the cover portion is fixed.

According to the present disclosure, by covering the top portion of the shaft and the through hole which is provided in the rotor blade and through which the shaft is caused to pass with the cover portion, it is possible to prevent the contact between the corrosive gas and the shaft, particularly, the top portion of the shaft, and correct balance of the rotating body by the balance correction function provided in the cover portion.

DETAILED DESCRIPTION

A vacuum pump according to an example of the present disclosure includes a rotating body including a rotating shaft and a rotor blade which has a through hole through which a top portion of the rotating shaft is caused to pass and is fixed with the top portion caused to pass through the through hole, and a cover portion which is fixed to the rotating body so as to cover the top portion of the rotating shaft and the through hole, and the cover portion includes a balance correction function for correcting unbalance of the rotating body and has corrosion resistance to exhaust gas.

In the present example, by providing a cover portion, it is possible to avoid contact between a top portion of a shaft (rotor shaft top portion) and corrosive gas, and prevent dust generation from the shaft. In addition, the cover portion includes a balance correction function for a rotating body, and hence, even when the cover portion is provided at the top portion of the shaft, it is possible to correct unbalance of the rotating body.

Hereinbelow, a preferred example of the present disclosure will be described in detail with reference to FIGS. 1 to 11.

Note that a cover portion 500 which is a characteristic portion of the present example will be described in detail in FIGS. 5 to 8.

Figure 1:
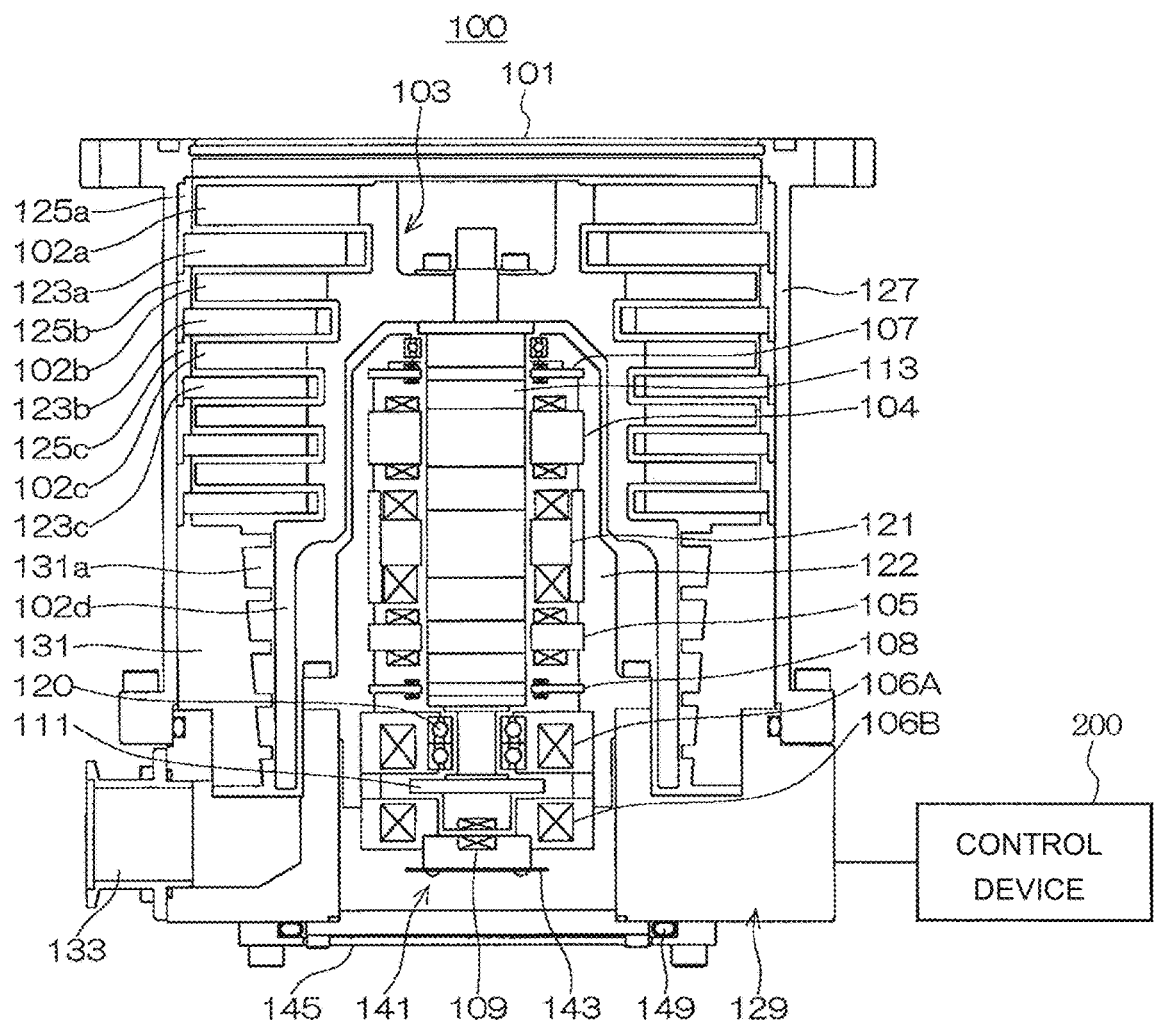
FIG. 1 is a view showing an example of a schematic configuration of a turbo-molecular pump according to an example of the present disclosure.

FIG. 1 shows a longitudinal sectional view of a turbo-molecular pump (vacuum pump) 100. In FIG. 1, in the turbo-molecular pump 100, an inlet port 101 is formed at an upper end of a cylindrical outer tube 127. In addition, inside the outer tube 127, a rotating body 103 in which a plurality of rotor blades 102 (102a, 102b, 102c . . . ) which are turbine blades for sucking and exhausting gas are formed radially in multiple tiers in a peripheral portion is provided. A rotor shaft 113 is attached to the center of the rotating body 103, and the rotor shaft 113 is supported so as to be levitated in the air by, e.g., a five-axis control magnetic bearing and a position of the rotor shaft 113 is controlled also by the five-axis control magnetic bearing. In general, the rotating body 103 is constituted by a metal such as aluminum or an aluminum alloy.

Upper radial electromagnets 104 are disposed such that four electromagnets are paired in an X-axis and a Y-axis. Four upper radial sensors 107 are provided so as to be close to the upper radial electromagnets 104 and correspond to the individual upper radial electromagnets 104. As the upper radial sensor 107, an inductance sensor having, e.g., a conductive winding or an eddy current sensor is used, and the upper radial sensor 107 detects a position of the rotor shaft 113 based on change of inductance of the conductive winding which changes according to the position of the rotor shaft 113. The upper radial sensor 107 is configured to detect a radial displacement of the rotor shaft 113, i.e., the rotating body 103 fixed to the rotor shaft 113, and send the radial displacement thereof to a control device 200.

In the control device 200, for example, a compensation circuit having a PID adjustment function generates an excitation control command signal of the upper radial electromagnet 104 based on a position signal detected by the upper radial sensor 107, and an amplifier circuit 150 (described later) shown in FIG. 2 performs excitation control on the upper radial electromagnet 104 based on the excitation control command signal, whereby an upper radial position of the rotor shaft 113 is adjusted.

The rotor shaft 113 is formed of a high-permeability material (iron, stainless steel, or the like), and is attracted by magnetic force of the upper radial electromagnet 104. Such adjustment is performed in an X-axis direction and in a Y-axis direction independently. In addition, a lower radial electromagnet 105 and a lower radial sensor 108 are disposed similarly to the upper radial electromagnet 104 and the upper radial sensor 107, and adjust a lower radial position of the rotor shaft 113 similarly to the upper radial position.

Further, axial electromagnets 106A and 106B are disposed so as to vertically sandwich a disc-shaped metal disc 111 provided below the rotor shaft 113. The metal disc 111 is constituted by a high-permeability material such as iron. A configuration is adopted in which an axial sensor 109 is provided for detecting an axial displacement of the rotor shaft 113, and an axial position signal is sent to the control device 200.

In the control device 200, for example, the compensation circuit having the PID adjustment function generates an excitation control command signal of each of the axial electromagnet 106A and the axial electromagnet 106B based on the axial position signal detected by the axial sensor 109, and the amplifier circuit 150 performs excitation control on each of the axial electromagnet 106A and the axial electromagnet 106B based on the excitation control command signals, whereby the axial electromagnet 106A attracts the metal disc 111 upward with magnetic force, the axial electromagnet 106B attracts the metal disc 111 downward, and an axial position of the rotor shaft 113 is thereby adjusted.

Thus, the control device 200 properly adjusts the magnetic force exerted on the metal disc 111 by the axial electromagnets 106A and 106B to magnetically levitate the rotor shaft 113 in an axial direction and hold the rotor shaft 113 in space in a non-contact manner. Note that the amplifier circuit 150 which performs the excitation control on the upper radial electromagnets 104, the lower radial electromagnet 105, and the axial electromagnets 106A and 106B will be described later.

Meanwhile, a motor 121 includes a plurality of magnetic poles which are disposed circumferentially so as to surround the rotor shaft 113. Each magnetic pole is controlled by the control device 200 so as to rotationally drive the rotor shaft 113 via an electromagnetic force acting between the magnetic pole and the rotor shaft 113. In addition, a rotational speed sensor such as, e.g., a Hall element, a resolver, or an encoder which is not shown is incorporated into the motor 121, and a rotational speed of the rotor shaft 113 is detected by a detection signal of the rotational speed sensor.

Further, a phase sensor which is not shown is mounted in the vicinity of, e.g., the lower radial sensor 108, and is configured to detect a phase of rotation of the rotor shaft 113. The control device 200 is configured to detect a position of the magnetic pole by using detection signals of both of the phase sensor and the rotational speed sensor.

A plurality of stator blades 123 (123*a*, 123*b*, 123*c* . . . ) are provided so as to be slightly spaced from the rotor blades 102 (102*a*, 102*b*, 102*c* . . . ). Each of the rotor blades 102 (102*a*, 102*b*, 102*c* . . . ) transfers a molecule of exhaust gas downward by collision, and hence each of the rotor blades 102 is formed so as to be inclined from a plane perpendicular to an axis of the rotor shaft 113 by a predetermined angle. The stator blades 123 (123*a*, 123*b*, 123*c* . . . ) are constituted by a metal such as, e.g., aluminum, iron, stainless steel, or copper, or metals such as alloys containing these metals as ingredients.

In addition, similarly, each of the stator blades 123 is also formed so as to be inclined from the plane perpendicular to the axis of the rotor shaft 113 by a predetermined angle, and the stator blades 123 are disposed so as to extend toward an inner side of the outer tube 127 and alternate with tiers of the rotor blades 102. Further, outer peripheral ends of the stator blades 123 are supported in a state in which the outer peripheral ends thereof are inserted between a plurality of stator blade spacers 125 (125*a*, 125*b*, 125*c* . . . ) which are stacked on each other.

Each of the stator blade spacers 125 is a ring-shaped member, and is constituted by a metal such as, e.g., aluminum, iron, stainless steel, or copper, or metals such as alloys containing these metals as ingredients. The outer tube 127 is fixed to an outer periphery of the stator blade spacer 125 so as to be slightly spaced from the outer periphery thereof. A base portion 129 is disposed at a bottom portion of the outer tube 127. An outlet port 133 is formed in the base portion 129, and is caused to communicate with the outside. Exhaust gas which has entered the inlet port 101 from a side of a chamber (vacuum chamber) and has been transferred to the base portion 129 is sent to the outlet port 133.

Further, depending on usage of the turbo-molecular pump 100, a threaded spacer 131 is disposed between a portion below the stator blade spacer 125 and the base portion 129. The threaded spacer 131 is a cylindrical member constituted by metals such as aluminum, copper, stainless steel, iron, or alloys containing these metals as ingredients, and a spiral thread groove 131*a* having a plurality of threads is formed in an inner peripheral surface of the threaded spacer 131. A direction of the spiral of the thread groove 131*a* is a direction in which, when the molecule of the exhaust gas moves in a rotation direction of the rotating body 103, this molecule is transferred toward the outlet port 133. At the lowest portion of the rotating body 103 subsequent to the rotor blades 102 (102*a*, 102*b*, 102*c* . . . ), a cylindrical portion 102*d* is disposed and extend downward. An outer peripheral surface of the cylindrical portion 102*d* is cylindrical, is protruded toward the inner peripheral surface of the threaded spacer 131, and is disposed close to the inner peripheral surface of the threaded spacer 131 with a predetermined gap formed between the outer peripheral surface thereof and the inner peripheral surface thereof. The exhaust gas having been transferred to the thread groove 131*a* by the rotor blades 102 and the stator blades 123 is sent to the base portion 129 while being guided by the thread groove 131*a*.

The base portion 129 is a disc-shaped member constituting a base bottom portion of the turbo-molecular pump 100 and, in general, the base portion 129 is constituted by a metal such as iron, aluminum, or stainless steel. The base portion 129 physically holds the turbo-molecular pump 100 and also has a function of a heat conductive path, and hence it is preferable to use a metal having rigidity of iron, aluminum, or copper and having high heat conductivity.

In such a configuration, when the rotor blade 102 is rotationally driven together with the rotor shaft 113 by the motor 121, the exhaust gas is sucked from the chamber through the inlet port 101 by actions of the rotor blade 102 and the stator blade 123. The rotational speed of the rotor blade 102 is usually 20000 rpm to 90000 rpm, and a circumferential velocity at a tip of the rotor blade 102 reaches 200 m/s to 400 m/s. The exhaust gas sucked from the inlet port 101 passes between the rotor blade 102 and the stator blade 123 and is transferred to the base portion 129. At this point, a temperature of the rotor blade 102 rises due to frictional heat generated when the exhaust gas comes into contact with the rotor blade 102 and conduction of heat generated in the motor 121, and this heat is transmitted to a side of the stator blade 123 by radiation or conduction by a gas molecule of the exhaust gas.

The stator blade spacers 125 are bonded to each other at their outer peripheral portions, and transmit heat received from the rotor blade 102 by the stator blade 123 and frictional heat generated when the exhaust gas comes into contact with the stator blade 123 to the outside.

Note that, in the foregoing, the description has been made on the assumption that the threaded spacer 131 is disposed on the outer periphery of the cylindrical portion 102*d* of the rotating body 103, and the thread groove 131*a* is formed in the inner peripheral surface of the threaded spacer 131. However, reversely to this, there are cases where the thread groove is formed in an outer peripheral surface of the cylindrical portion 102*d*, and a spacer having a cylindrical inner peripheral surface is disposed around the outer peripheral surface thereof.

In addition, depending on usage of the turbo-molecular pump 100, in order to prevent gas sucked from the inlet port 101 from entering an electrical component portion constituted by the upper radial electromagnet 104, the upper radial sensor 107, the motor 121, the lower radial electromagnet 105, the lower radial sensor 108, the axial electromagnets 106A and 106B, and the axial sensor 109, there are cases where a surrounding portion of the electrical component portion is covered with a stator column 122, and a pressure in the stator column 122 is maintained at a predetermined pressure by purge gas.

In these cases, piping which is not shown is disposed in the base portion 129, and the purge gas is introduced through the piping. The introduced purge gas is sent to the outlet port 133 through gaps between a protection bearing 120 and the rotor shaft 113, between a rotor and a stator of the motor 121, and between the stator column 122 and an inner peripheral side cylindrical portion of the rotor blade 102.

Herein, the turbo-molecular pump 100 uses control based on identification of a model and inherent parameters which are adjusted individually (e.g., various characteristics corresponding to the model). For storing the control parameters, the above-described turbo-molecular pump 100 includes an electronic circuit portion 141 in a main body of the turbo-molecular pump 100. The electronic circuit portion 141 is constituted by electronic components such as a semiconductor memory such as an EEP-ROM and a semiconductor element for accessing the semiconductor memory, and a substrate 143 for implementing the electronic components. The electronic circuit portion 141 is housed in a lower portion of a rotational speed sensor which is not shown in the vicinity of, e.g., the center of the base portion 129 constituting a lower portion of the turbo-molecular pump 100, and the lower portion is closed by a hermetic bottom lid 145.

Incidentally, in a manufacturing process of a semiconductor, some process gases introduced into a chamber have properties which make the process gases solid when pressure of the process gases becomes higher than a predetermined value or temperature of the process gases becomes lower than a predetermined value. Inside the turbo-molecular pump 100, pressure of the exhaust gas is minimized at the inlet port 101 and is maximized at the outlet port 133. When the pressure of the process gas becomes higher than a predetermined value or the temperature thereof becomes lower than a predetermined value during transfer of the process gas from the inlet port 101 to the outlet port 133, the process gas becomes solid, and is adhered to and deposited on the inside of the turbo-molecular pump 100.

For example, in the case where $SiCl_4$ is used as process gas in an Al etching device, it can be seen from a vapor pressure curve that a solid product (e.g., $AlCl_3$) is precipitated at a low degree of vacuum (760 [torr] to $10^{-2}$ [torr]) and at a low temperature (about 20[° C.]) and the solid product is adhered to and deposited on the inside of the turbo-molecular pump 100. With this, when the precipitate of the process gas is deposited on the inside of the turbo-molecular pump 100, the deposit narrows a pump flow path and becomes a cause of a reduction in performance of the turbo-molecular pump 100. In addition, the above-described product is in a situation in which the product is easily coagulated and adhered in a portion in which pressure is high in the vicinity of the outlet port 133 or in the vicinity of the threaded spacer 131.

Accordingly, in some examples, conventionally, a heater which is not shown or an annular water cooled tube 149 is wound around an outer periphery of the base portion 129 or the like, a temperature sensor (e.g., a thermistor) which is not shown is embedded in, e.g., the base portion 129, and control of heating by the heater or cooling by the water cooled tube 149 is performed such that a temperature of the base portion 129 is maintained at a constant high temperature (set temperature) based on a signal of the temperature sensor (hereinafter referred to as TMS. TMS; Temperature Management System).

Next, with regard to the thus-configured turbo-molecular pump 100, a description will be given of the amplifier circuit 150 which performs excitation control on the upper radial electromagnets 104, the lower radial electromagnet 105, and the axial electromagnets 106A and 106B. FIG. 2 shows a circuit diagram of the amplifier circuit 150.

Figure 2:
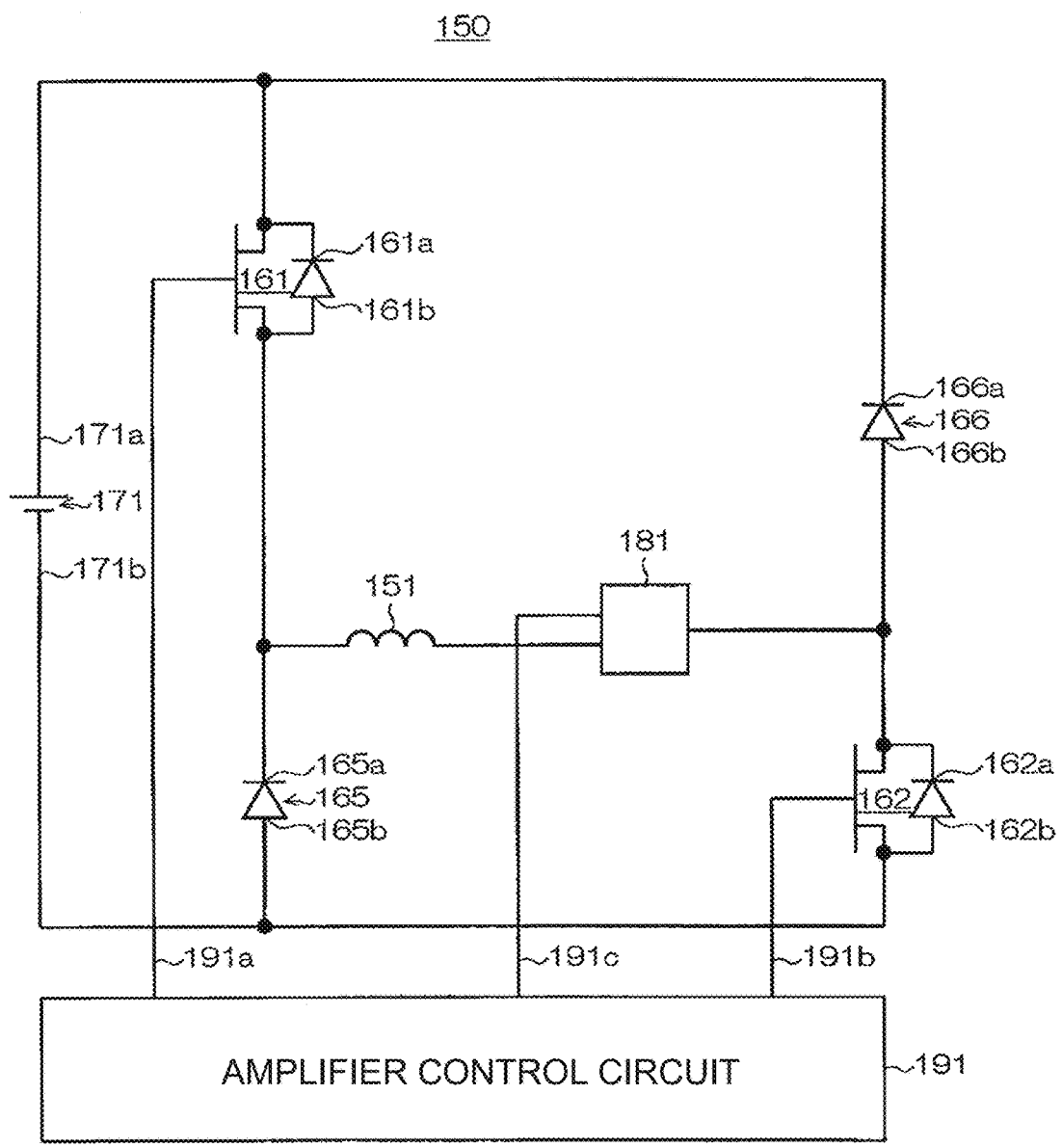
FIG. 2 is a view showing a circuit diagram of an amplifier circuit used in the example of the present disclosure.

In FIG. 2, one end of an electromagnet winding 151 constituting the upper radial electromagnet 104 or the like is connected to a positive electrode 171a of a power source 171 via a transistor 161, and the other end thereof is connected to a negative electrode 171b of the power source 171 via a current detection circuit 181 and a transistor 162. In addition, each of the transistors 161 and 162 is a so-called power MOSFET, and has a structure in which a diode is connected between a source and a drain.

At this point, in the transistor 161, a cathode terminal 161a of its diode is connected to the positive electrode 171a, and an anode terminal 161b is connected to the one end of the electromagnet winding 151. In addition, in the transistor 162, a cathode terminal 162a of its diode is connected to the current detection circuit 181, and an anode terminal 162b is connected to the negative electrode 171b.

On the other hand, in a diode for current regeneration 165, its cathode terminal 165a is connected to the one end of the electromagnet winding 151, and its anode terminal 165b is connected to the negative electrode 171b. In addition, similarly to this, in a diode for current regeneration 166, its cathode terminal 166a is connected to the positive electrode 171a, and its anode terminal 166b is connected to the other end of the electromagnet winding 151 via the current detection circuit 181. The current detection circuit 181 is constituted by, e.g., a Hall sensor-type current sensor and an electrical resistance element.

The thus-configured amplifier circuit 150 corresponds to one electromagnet. Accordingly, in the case where a magnetic bearing is a five-axis control magnetic bearing and the total number of electromagnets 104, 105, 106A, and 106B is ten, the same amplifier circuit 150 is configured for each of the electromagnets, and ten amplifier circuits 150 are connected in parallel to the power source 171.

Further, an amplifier control circuit 191 is constituted by, e.g., a digital signal processor portion (hereinafter referred to as a DSP portion) of the control device 200 which is not shown, and the amplifier control circuit 191 is configured to switch between on/off of the transistors 161 and 162.

The amplifier control circuit 191 is configured to compare a current value (a signal in which this current value is reflected is referred to as a current detection signal 191c) detected by the current detection circuit 181 with a predetermined current command value. Subsequently, the amplifier control circuit 191 is configured to determine magnitudes of a pulse width (pulse width time periods Tp1 and Tp2) generated in a control cycle Ts which is one cycle by PWM control based on a comparison result. As a result, gate drive signals 191a and 191b each having this pulse width are output to gate terminals of the transistors 161 and 162 from the amplifier control circuit 191.

Note that, at the time of passage of a resonance point during acceleration operation of the rotational speed of the rotating body 103 or at the time of occurrence of disturbance during constant speed operation, it is desirable to perform position control of the rotating body 103 at high speed with a strong force. To cope with this, a high voltage of about, e.g., 50 V is used as the power source 171 such that a sharp increase (or decrease) of a current flowing to the electromagnet winding 151 is allowed. In addition, a capacitor (depiction is omitted) is usually connected between the positive electrode 171a and the negative electrode 171b of the power source 171 for stabilization of the power source 171.

In such a configuration, a current flowing to the electromagnet winding 151 (hereinafter referred to as an electromagnet current iL) is increased when both of the transistors 161 and 162 are turned on, and the electromagnet current iL is decreased when both of the transistors 161 and 162 are turned off.

In addition, when one of the transistors 161 and 162 is turned on and the other one thereof is turned off, a so-called flywheel current is maintained. By flowing the flywheel current to the amplifier circuit 150 in this manner, it is possible to reduce hysteresis loss in the amplifier circuit 150 and suppress power consumption in the entire circuit to a low level. In addition, by controlling the transistors 161 and 162 in this manner, it is possible to reduce high frequency noise such as harmonics generated in the turbo-molecular pump 100. Further, by measuring the flywheel current in the current detection circuit 181, it becomes possible to detect the electromagnet current iL flowing in the electromagnet winding 151.

Figure 3:
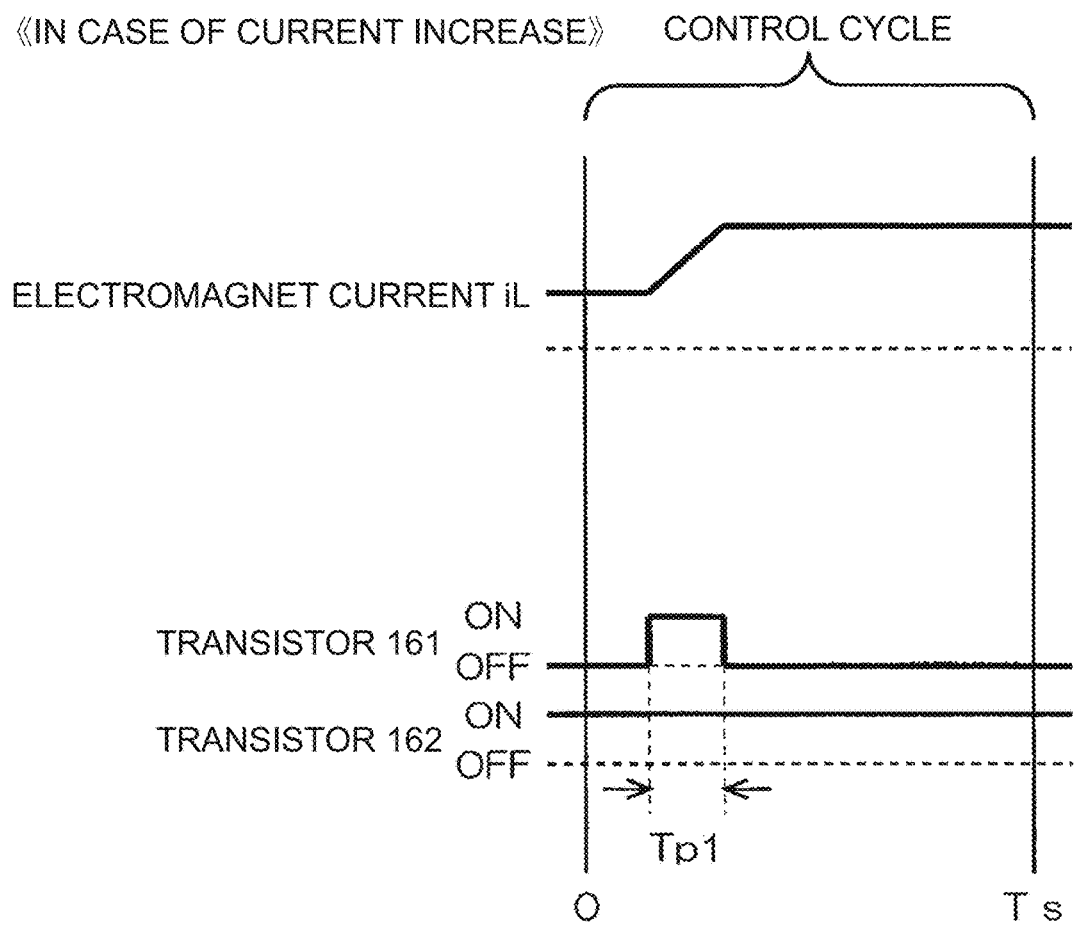
FIG. 3 is a time chart showing control in the case where a current command value is smaller than a detection value in the example of the present disclosure.

That is, in the case where a detected current value is smaller than a current command value, as shown in FIG. 3, both of the transistors 161 and 162 are turned on only once in the control cycle Ts (e.g., 100 μs) for a time period corresponding to the pulse width time period Tp1. Consequently, the electromagnet current iL during this time period is increased toward a current value iLmax (not shown) which can be flowed from the positive electrode 171a to the negative electrode 171b via the transistors 161 and 162.

Figure 4:
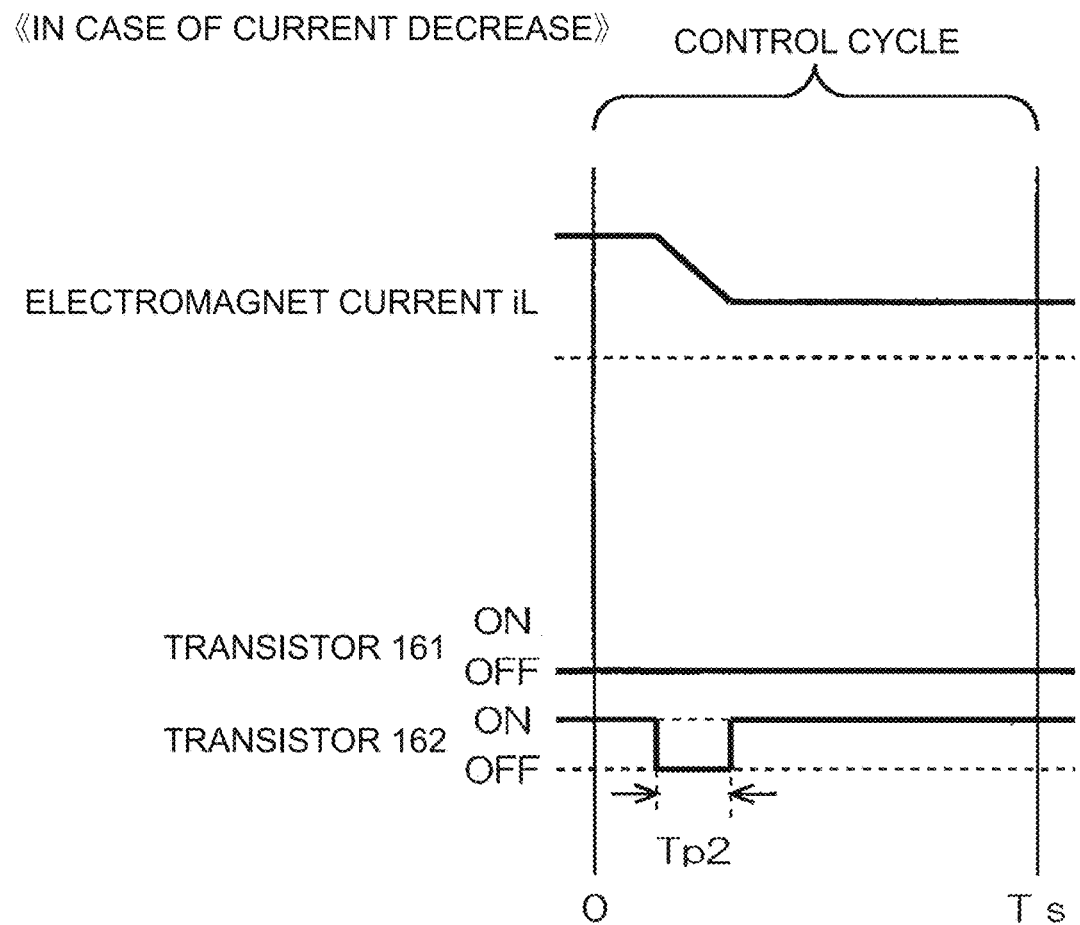
FIG. 4 is a time chart showing control in the case where the current command value is larger than the detection value in the example of the present disclosure.

On the other hand, in the case where the detected current value is larger than the current command value, as shown in FIG. 4, both of the transistors 161 and 162 are turned off only once in the control cycle Ts for a time period corresponding to the pulse width time period Tp2. Consequently, the electromagnet current iL during this time period is decreased toward a current value iLmin (not shown) which can be regenerated from the negative electrode 171b to the positive electrode 171a via the diodes 165 and 166.

In either case, after a lapse of the pulse width time period Tp1 or Tp2, one of the transistors 161 and 162 is turned on. Accordingly, during this time period, the flywheel current is maintained in the amplifier circuit 150.

Figure 5:
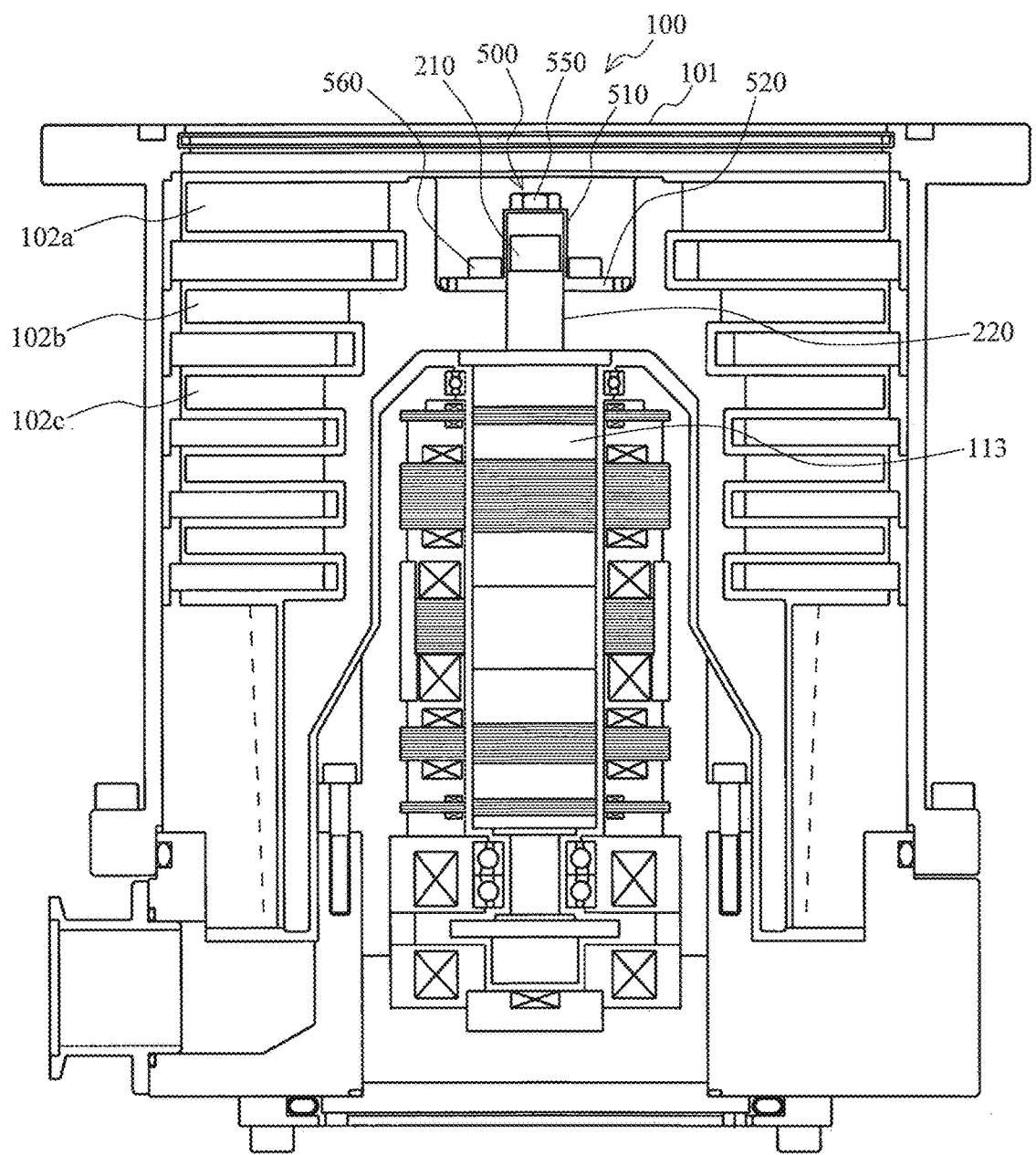
FIG. 5 is a view showing an example of a schematic configuration including a cover portion of a vacuum pump according to the example of the present disclosure.
Figure 6:
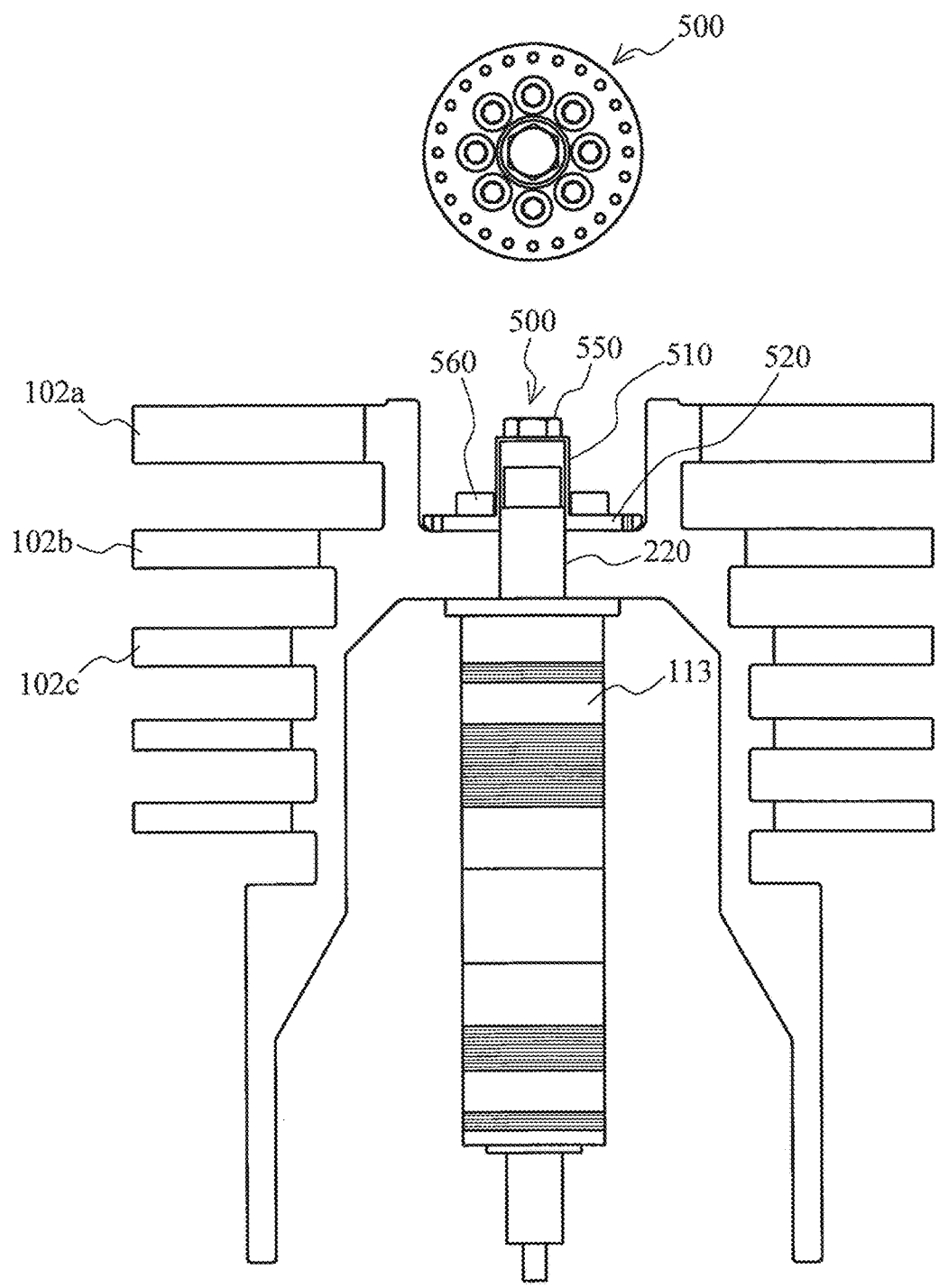
FIG. 6 is a view showing an example of a schematic configuration of a rotating body according to the example of the present disclosure.

FIG. 5 is a view showing an example of a schematic configuration including the cover portion 500 of the vacuum pump (turbo-molecular pump) according to the present example. In addition, FIG. 6 is a view showing an example of a schematic configurating of the rotating body according to the present example.

As shown in FIG. 5, the cover portion 500 is installed so as to cover a rotor shaft top portion 210 of the rotor shaft 113. By installing the cover portion 500, it is possible to completely cover the rotor shaft top portion 210 and a through hole 220 formed in the rotor blades 102 (102a, 102b, 102c . . . ) for causing the rotor shaft top portion 210 to pass through the through hole 220. The cover portion 500 is fixed to the rotor blades 102 by a fastening bolt 560.

The cover portion 500 comes into contact with the process gas, and hence it is preferable to perform corrosion-resistant surface treatment on the cover portion 500.

With the cover portion 500, it is possible to avoid contact between the process gas taken in from the inlet port 101 and the rotor shaft top portion 210, and prevent the process gas from entering a further inner portion through the through hole 220.

Figure 7:
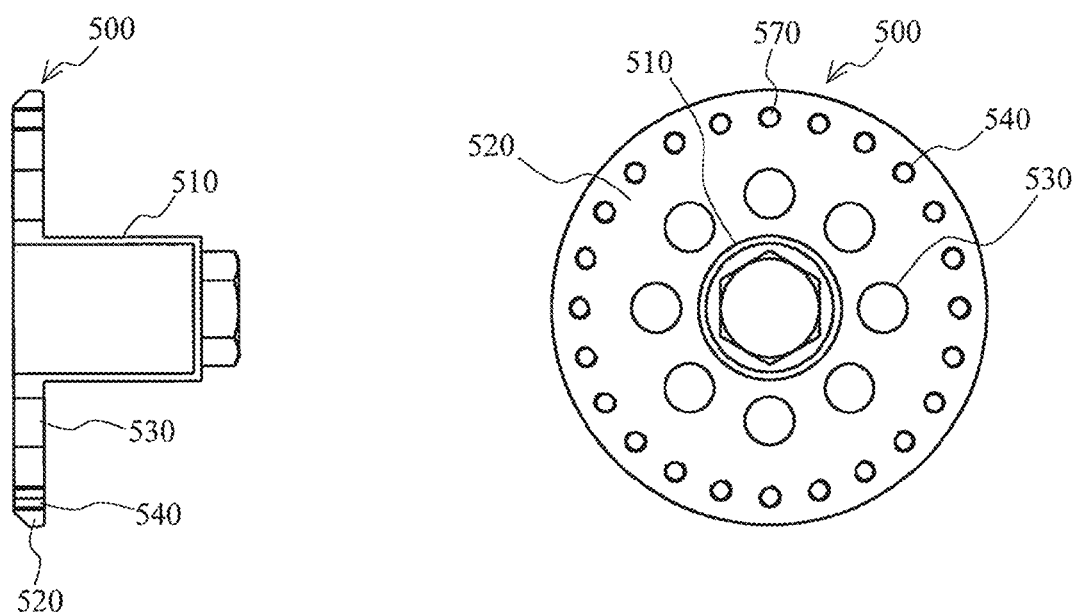
FIG. 7 is a view showing an example of a schematic configuration of the cover portion according to the example of the present disclosure.
Figure 8:
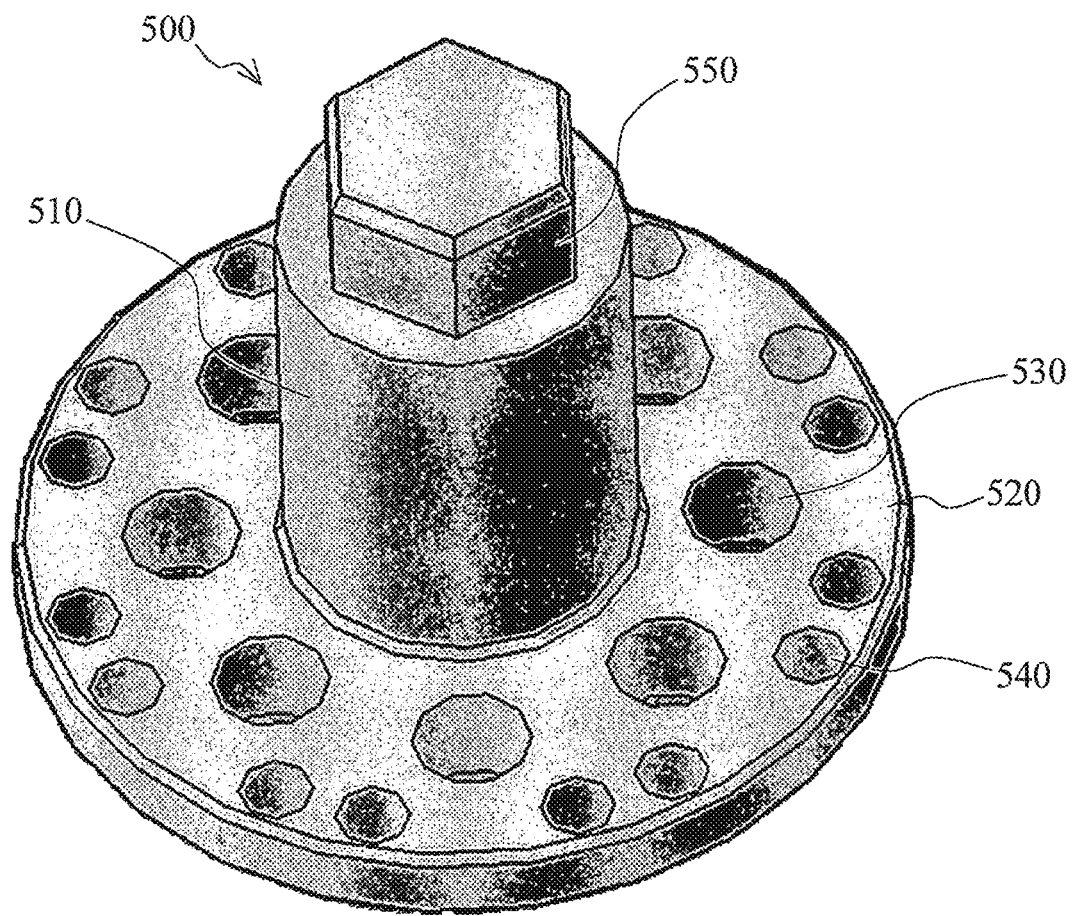
FIG. 8 is a perspective view of the cover portion shown in FIG. 7.

FIG. 7 is a view showing an example of a schematic configuration of the cover portion 500 according to the example of the present disclosure, and FIG. 8 is a perspective view of the cover portion 500 shown in FIG. 7.

The cover portion 500 has a shape of a silk hat for covering the rotor shaft top portion 210 and the through hole 220, and is formed of a cap portion 510 and a washer portion 520. The cover portion 500 also has a function of achieving balance, and hence it is desirable that the cover portion 500 is concentric with the rotor shaft 113 as much as possible and is in a shape of a perfect circle.

The cap portion 510 has a shape which engages with a shape of the rotor shaft top portion 210 in order to cover the rotor shaft_top portion 210.

Further, the washer portion 520 has a function of not only fixing the cover portion 500 and the rotor blades 102 to each other but also fastening the rotor blades 102 and the rotor shaft 113 to each other, and a plurality of (eight locations in the present example) bolt through holes 530 are provided. Note that the number of locations of the bolt through holes 530 is not limited to eight, and the number thereof may also be another number such as, e.g., two, four, or six.

The bolt through hole 530 passes through the washer portion 520, and fixes (fastens) the cover portion to the rotor blades 102 and the rotor shaft 113 through the fastening bolt 560 when the cover portion 500 is installed (a side of the rotor shaft 113 is threaded).

Note that, as a method for fixing the cover portion 500 and the rotor blades 102 to each other, a side of the rotor blades 102 may also be threaded.

Note that the fastening bolt 560 comes into contact with the process gas, and hence it is desirable to perform corrosion-resistant surface treatment on the fastening bolt 560 or use a material having corrosion resistance as the material of the fastening bolt 560.

Balance weight threaded holes 540 are further provided in the washer portion 520. In the example shown in the drawing, the balance weight threaded holes 540 are provided at 24 locations, but the number of locations can be set appropriately.

The inside of the balance weight threaded hole 540 is threaded for attaching a balance weight screw 570. FIG. 7 shows a state in which the balance weight screw 570 is attached to the balance weight threaded hole 540.

By attaching the balance weight screw 570 to the balance weight threaded hole 540 while adjusting balance, it is possible to correct balance of the rotating body (the rotor blades 102 and the rotor shaft 113) which rotates at high speed.

Note that, in the present example, it is possible to correct unbalance in a state in which the cover portion 500 is fixed.

The balance weight screw 570 comes into contact with the process gas, and hence the balance weight screw 570 preferably has corrosion resistance. For example, corrosion-resistant surface treatment is performed on the balance weight screw 570.

Thus, the cover portion 500 has the function of avoiding the contact between the rotor shaft top portion 210 and the process gas and correcting the balance of the rotating body when the cover portion is attached.

A fitting portion 550 is provided at a top portion of the cover portion 500. The fitting portion 550 is formed into a shape which allows the fitting portion 550 to be fitted to a predetermined tool in a process of mounting the rotor blades 102, and the fitting portion 550 can play a role in supporting or fixing the rotor blades 102 via the cover portion 500 by being fitted to the tool and plays a role at the time of a rotating body mounting process described later.

A material of the cover portion 500 is preferably a material having corrosion resistance higher than that of the rotor shaft 113 (the rotor shaft top portion 210). For example, as the material of the cover portion 500, it is possible to use, among stainless steels, SUS316 having high corrosion resistance.

Next, the rotating body mounting process in the present example will be described.

Figure 9:
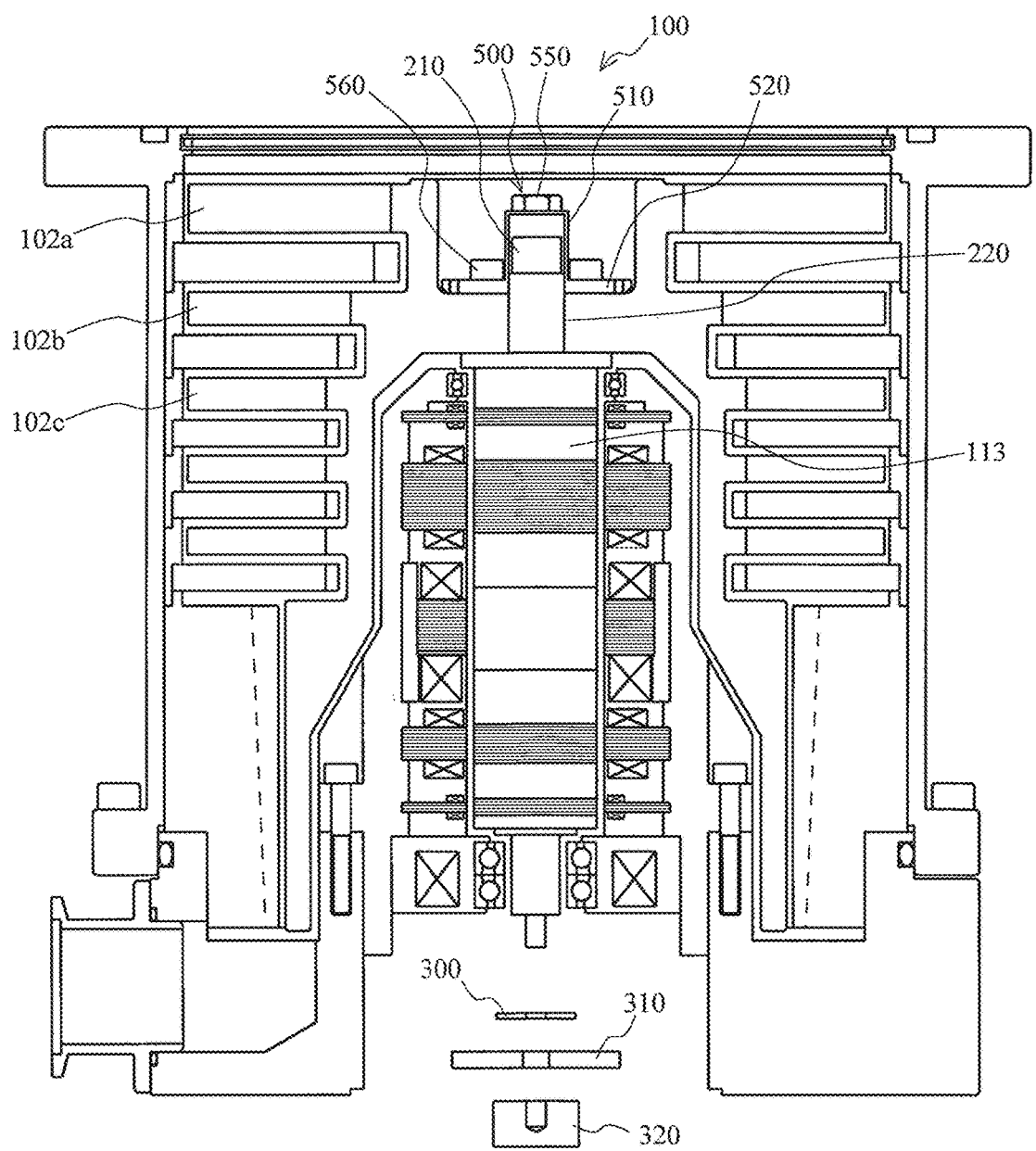
FIG. 9 is a view for explaining a rotating body mounting process (before an armature disc is fixed) in the present example.
Figure 10:
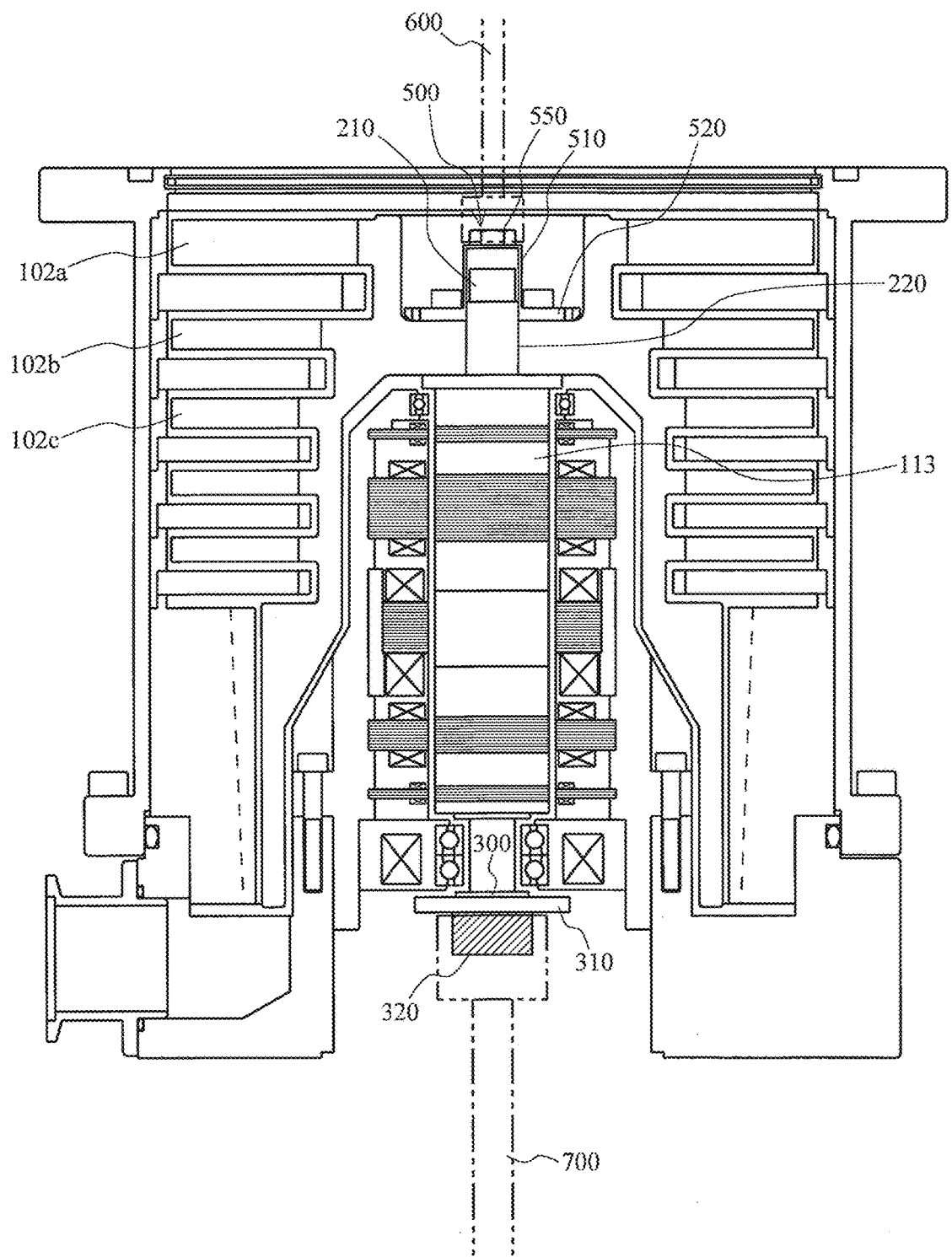
FIG. 10 is a view for explaining the rotating body mounting process (after the armature disc is fixed) in the present example.
Figure 11:
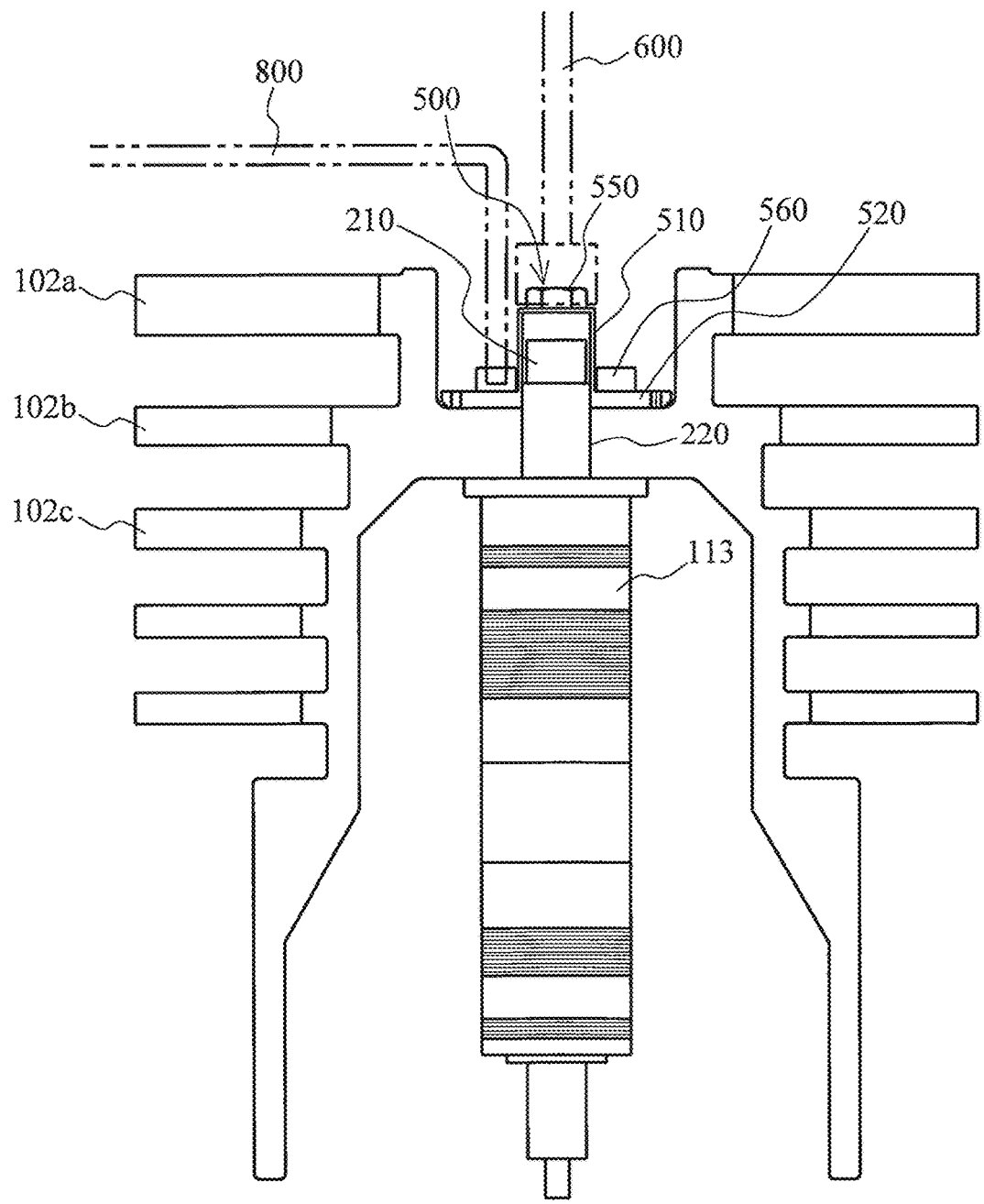
FIG. 11 is a view for explaining the rotating body mounting process (shaft fastening) in the present example.

FIG. 9 is a view for explaining the rotating body mounting process (before an armature disc is fixed) in the present example, FIG. 10 is a view for explaining the rotating body mounting process (after the armature disc is fixed) in the present embodiment, and FIG. 11 is a view for explaining the rotating body mounting process (shaft fastening) in the present example.

As shown in FIG. 9, before an armature disc 310 is fixed, a washer 300, the armature disc 310, and a nut 320 are mounted one by one.

The washer 300 is used for performing alignment, and is also used for the purpose of preventing diffraction of a magnetic flux from the armature disc 310.

The armature disc 310 is constituted by a magnetic material, and is a disc for exerting attraction force by an electromagnet.

The nut 320 tightens and fixes the armature disc 310.

Then, as shown in FIG. 10, the washer 300 and the armature disc 310 are fixed by tightening the nut 320 with a tool 700. At this point, in order to prevent the rotor shaft 113 from rotating to prevent tightening, the cover portion 500 is fixed with a tool 600. The tool 600 is formed into a shape which allows the tool 600 to be fitted to the fitting portion 550 provided at the top portion of the cover portion 500.

The cover portion 500 is fixed (fastened) to the rotor blades 102 and the rotor shaft 113, and hence the fitting portion 550 provided at the top portion of the cover portion 500 is fixed with the tool 600, whereby it is possible to easily tighten the nut 320 without causing rotation of the rotor blades 102 and the rotor shaft 113.

Then, although the order of processes is changed, the time during which the rotating body is mounted (at the time of shaft fastening) will be described.

As shown in FIG. 11, the fastening bolt 560 is fastened by using a tool 800. Also at this point, in order to prevent the rotor shaft 113 from rotating to prevent tightening, the cover portion 500 is fixed with the tool 600.

Thus, it is possible to fasten the cover portion 500 to the rotor blades 102 and the rotor shaft 113 easily and reliably.

Note that the example and modifications of the present disclosure may be combined.

In addition, the present disclosure can be variously modified without departing from the spirit of the present disclosure. In addition, it goes without saying that the present disclosure encompasses the modifications.

The invention claimed is:

1. A vacuum pump comprising:
a rotating body including a rotating shaft which is rotatably supported and a rotor blade which has a through hole, through which a top portion of the rotating shaft is caused to pass, and is fixed with the top portion caused to pass through the through hole; and
a cover portion including a cap portion covering the top portion of the rotating shaft and the through hole and a washer portion fixed to the rotating body, wherein
the cover portion includes a balance correction function for correcting unbalance of the rotating body and has corrosion resistance to exhaust gas,
the cover portion covering the top portion of the rotating shaft further includes a fitting portion protruding upward from a top portion of the cap portion, the fitting portion having a predetermined shape configured to fit with a tool for fixing or supporting the rotating body, wherein there is a gap between an upper surface of the top portion of the shaft and an axial inner surface of the cover portion,
an upper end of the fitting portion is positioned lower than an upper end of the rotating balance correction weight for correcting the unbalance of the rotating body to pass through the washer portion.

2. The vacuum pump according to claim 1, wherein:
the corrosion resistance of the cover portion to the exhaust gas is achieved by performing corrosion-resistant surface treatment on the cover portion.

3. The vacuum pump according to claim 1, wherein:
the balance correction function is performed by the balance correction weight disposed in a concave portion provided in the cover portion, and the balance correction weight has the corrosion resistance to the exhaust gas.

4. The vacuum pump according to claim 3, wherein:
the corrosion-resistant surface treatment to the exhaust gas is performed on the balance correction weight.

5. A rotating body comprising:
a rotating shaft which is rotatably supported; and
a rotor blade which has a through hole, through which a top portion of the rotating shaft is caused to pass, and is fixed with the top portion caused to pass through the through hole,
the rotating body further comprising:
a cover portion including a cap portion covering the top portion of the rotating shaft and the through hole and a washer portion fixed to the rotating body, wherein
the cover portion includes a balance correction function for correcting unbalance of the rotating body and has corrosion resistance to exhaust gas,
the cover portion covering the top portion of the rotating shaft further includes a fitting portion protruding upward from a top portion of the cap portion, the fitting portion having a predetermined shape configured to fit with a tool for fixing or supporting the rotating body, wherein there is a gap between an upper surface of the top portion of the shaft and an axial inner surface of the cover portion,
an upper end of the fitting portion is positioned lower than an upper end of the rotating body, and
the washer portion is provided with a balance weight threaded hole for attaching a balance correction weight for correcting the unbalance of the rotating body to pass through the washer portion.

6. A cover portion including a cap portion configured to cover a top portion of a rotating shaft and a through hole of a rotating body and a washer portion configured to be fixed to the rotating body, the rotating body including the rotating shaft which is rotatably supported and a rotor blade which has the through hole, through which the top portion of the rotating shaft is caused to pass, and is fixed with the top portion caused to pass through the through hole,
- the cover portion including a balance correction function for correcting unbalance of the rotating body,
- the cover portion having corrosion resistance to exhaust gas,
- the cover portion covering the top portion of the rotating shaft further includes a fitting portion protruding upward from a top portion of the cap portion, the fitting portion having a predetermined shape configured to fit with a tool for fixing or supporting the rotating body, wherein there is a gap between an upper surface of the top portion of the shaft and an axial inner surface of the cover portion,
- an upper end of the fitting portion is positioned lower than an upper end of the rotating body, and
- the washer portion is provided with a balance weight threaded hole for attaching a balance correction weight for correcting the unbalance of the rotating body to pass through the washer portion.

\* \* \* \* \*